US008824055B2

(12) United States Patent
Cook

(10) Patent No.: US 8,824,055 B2
(45) Date of Patent: Sep. 2, 2014

(54) REFRACTIVE OPTICS WITH BROAD SPECTRAL COVERAGE

(71) Applicant: Raytheon Company, Waltham, MA (US)

(72) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 140 days.

(21) Appl. No.: 13/679,119

(22) Filed: Nov. 16, 2012

(65) Prior Publication Data

US 2014/0139926 A1 May 22, 2014

(51) Int. Cl.
G02B 27/14 (2006.01)
G02B 5/08 (2006.01)
G02B 27/12 (2006.01)

(52) U.S. Cl.
CPC .................................. *G02B 27/123* (2013.01)
USPC ............................ 359/634; 359/351; 359/629

(58) Field of Classification Search
USPC .......................................... 359/351, 629, 634
See application file for complete search history.

(56) References Cited

U.S. PATENT DOCUMENTS 6,792,028 B2 9/2004 Cook et al.
6,989,537 B2 1/2006 Cook
7,248,401 B2 * 7/2007 Bryant .......................... 359/351
2006/0285201 A1 12/2006 Bryant
2011/0051229 A1 3/2011 Alexay
2012/0081705 A1 4/2012 Cook et al.
2012/0081706 A1 4/2012 Cook et al.

FOREIGN PATENT DOCUMENTS

CN 101866054 A 10/2010
CN 102103265 A 6/2011

OTHER PUBLICATIONS

Bezdidko, Sergey N. et al., "Development of Multi-Spectral Lenses for Thermal Imaging Technique", Proceedings SPIE, 8128, Current Developments in Lens Design and Optical Engineering XII; and Advances in Thin Film Coatings, vol. 8128, Sep. 7, 2011.
Roberts, Michael et al., "Wide Waveband Infrared Optics", Proceedings SPIE 1013, Optical Design Methods, Applications and Large Optics, Apr. 13, 1989, pp. 84-91.

* cited by examiner

*Primary Examiner* — William Choi
(74) *Attorney, Agent, or Firm* — Lando & Anastasi, LLP

(57) ABSTRACT

A multi-band refractive optical imaging system. In one example, the system includes a plurality of lenses configured to receive and propagate electromagnetic radiation in at least the visible spectral band and the longwave infrared (LWIR) spectral band, the plurality of lenses including a first group of lenses of a first crown material, at least one lens of a first flint material, and at least one lens of a second material different than the first crown material and the first flint material. The plurality of lenses includes at least one crown-flint pair configured as an achromat to provide color correction in the visible and/or LWIR spectral bands. The system also includes a first beamsplitter configured to separate the electromagnetic radiation into the visible spectral band and the LWIR spectral band, and a rear external aperture stop positioned between the plurality of lenses and the first beamsplitter.

20 Claims, 4 Drawing Sheets

REFRACTIVE OPTICS WITH BROAD SPECTRAL COVERAGE

BACKGROUND

Search and acquisition applications use multiple sensors to cover wide fields of view around an asset, for example, up to $4\pi$ ster-radians. Conventionally, to achieve dual-band spectral coverage, particularly of widely-spaced spectral bands such as the visible band and the longwave infrared (LWIR) band, separate optical systems are used, each optimized for a particular spectral band.

SUMMARY OF INVENTION

Aspects and embodiments are directed to a compact refractive optical imaging system with broad spectral coverage. In some embodiments, refractive inverse telephoto optics with dual-band or multi-band spectral coverage are obtained using unique combinations of lenses and materials for the lenses. In other embodiments, pupil relay optics are obtained using similar unique lens materials, as discussed in detail below.

According to one embodiment, a multi-band refractive optical imaging system comprises a plurality of lenses configured to receive and propagate electromagnetic radiation in at least the visible spectral band and the longwave infrared (LWIR) spectral band, the plurality of lenses including a first group of lenses of a first crown material, at least one lens of a first flint material, and at least one lens of a second material, different than the first crown material and the first flint material, the plurality of lenses including at least one crown-flint pair configured as an achromat to provide color correction in at least one of the visible spectral band and the LWIR spectral band, a first beamsplitter configured to receive the electromagnetic radiation from the plurality of lenses, to separate the electromagnetic radiation into the visible spectral band and the LWIR spectral band, and a rear external aperture stop positioned between the plurality of lenses and the first beamsplitter.

In one example the optical imaging system has an inverse telephoto configuration. In one example the first crown material is an ionic salt compound and the first flint material is an ionic salt compound. In another example the second material is a second flint material. The first crown material may be cesium bromide, for example, and the first and second flint materials may be sodium chloride and zinc selenide, for example. In one example the first beamsplitter is a cube beamsplitter. The first beamsplitter may comprise cesium bromide, for example. In another example the first crown material is CVD diamond, and the achromat is a visible achromat that provides color correction in the visible spectral band. In this example, the second material may be a second crown material. In one example, the at least one crown-flint pair of the visible achromat comprises the second crown material and the first flint material. In one example, the second crown material is cesium chloride, and the first flint material is zinc selenide. In another example the plurality of lenses further comprises an aspheric corrector.

According to another example of multi-band refractive optical imaging system, the plurality of lenses is configured as a pupil relay, and the system further comprises an imaging optical sub-system including a second plurality of lenses, the first beamsplitter, and the rear external aperture stop, and a second beamsplitter positioned between the pupil relay and the imaging optical sub-system, the second beamsplitter configured to direct the electromagnetic radiation from the pupil relay to the imaging optical sub-system. The first beamsplitter may be configured to direct the LWIR spectral band onto a thermal imaging detector and the visible spectral band onto a visible imaging detector.

In one example the first group of lenses includes a first sub-group including at least two lenses and a second sub-group including at least two lenses, and wherein the pupil relay is configured to produce an intermediate image between the first and second sub-groups. In one example the first crown material is cesium bromide, the first flint material is cesium iodide, and the second material is a second flint material. The second flint material may be zinc selenide, for example. In another example, the first crown material is CVD diamond. In another example, the at least one lens of the first flint material includes two lenses of the first flint material, the two lenses positioned between the first sub-group and the second sub-group, and wherein the intermediate image is produced between the two lenses. In this example, the first flint material may be cesium iodide.

According to another example, the multi-band refractive optical imaging system further comprises a laser input configured to provide a laser beam to the pupil relay via the second beamsplitter, the pupil relay being further configured to propagate the laser beam to an entrance aperture of the optical imaging system. The multi-band refractive optical imaging system may further comprise a corner cube array, wherein the second beamsplitter is configured to reflect a portion of the laser beam onto the corner cube array, the corner cube array being configured to return the portion of the laser beam, through the second beamsplitter to the imaging optical sub-system as an auto-alignment beam. In one example the auto-alignment beam is in the visible spectral band, and the first beamsplitter is configured to direct the auto-alignment beam to the visible-band detector. In another example the first beamsplitter is further configured to direct an LWIR spectral band auto-alignment beam onto the thermal imaging detector.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
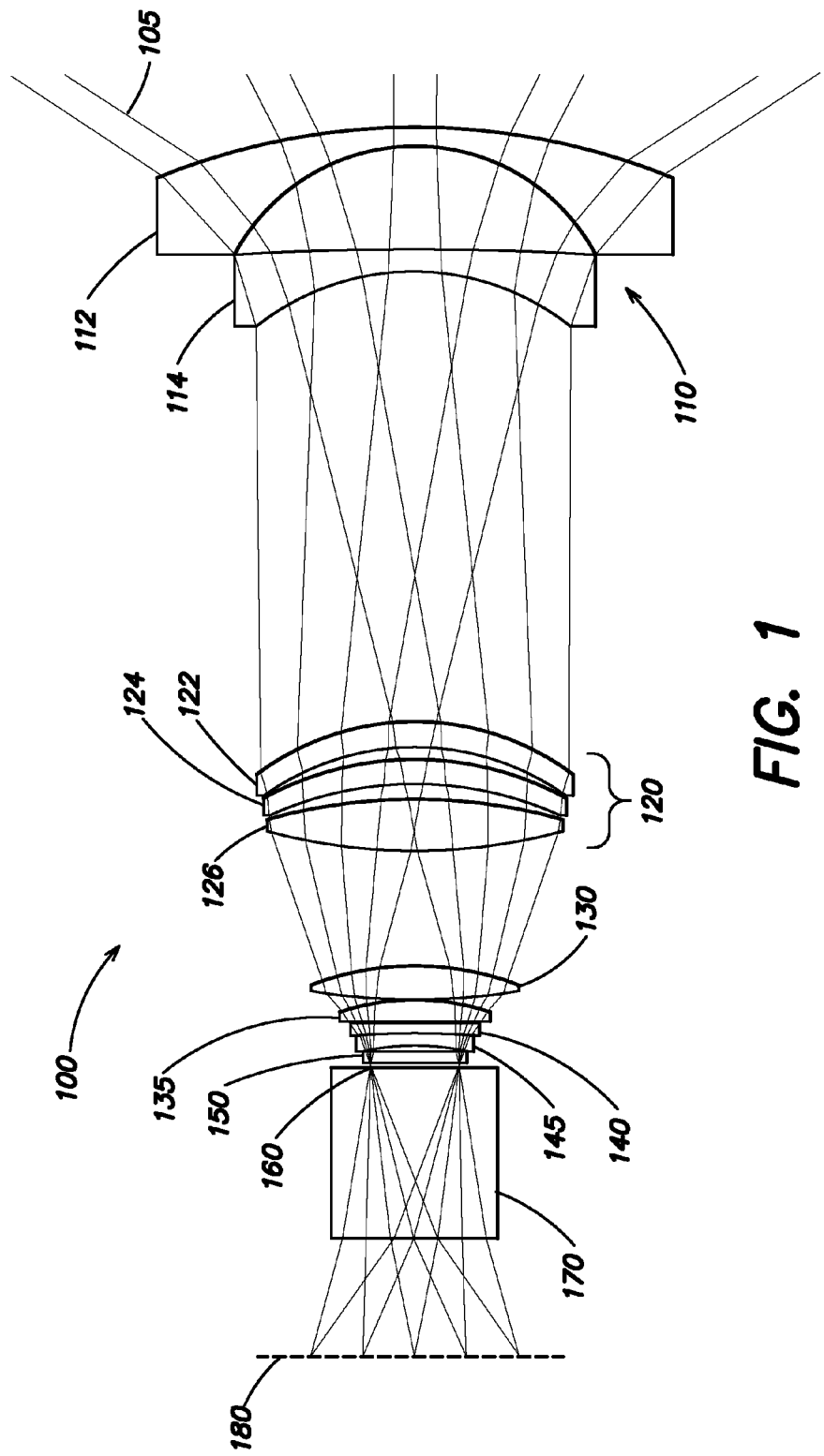
FIG. 1 is ray trace of one example of a dual-band, visible-LWIR, inverse telephoto optical system using ionic salt compounds according to aspects of the invention.

Existing dual-band imaging systems covering both the visible and LWIR spectral regions are typically reflective systems. However, for wide field-of-view coverage, for example, 115-120 degrees or more, reflective optical systems become extremely large, and are therefore unsuitable for many applications. Aspects and embodiments are directed to a compact multi-band refractive optical imaging system which, through the use of various unique material combinations, may achieve broad spectral coverage and a wide field of view, for example, greater than 2 radians (115-120 degrees or more). According to certain embodiments the optical system may be configured to simultaneously cover both the visible spectral band (e.g., approximately 0.6 µm to 1.0 µm) and the long-wave infrared spectral region (LWIR; e.g., approximately 7.0 µm to 14.0 µm). Furthermore, in some embodiments, additional spectral regions, for example, the shortwave infrared (SWIR) and/or midwave infrared (MWIR) regions, may also be covered, as discussed further below. Covering both the visible and LWIR spectral regions may be advantageous in many applications, including search and acquisition applications for example, because reflective objects may have enhanced visible signatures and thermal (or "black") objects may have enhanced LWIR signatures. Thus, two-color visible and LWIR imagery may provide enhanced detection capabilities. In addition, low maintenance, thermally-stabilized, uncooled focal plane array imaging sensors are available in both of these detection bands. For example, silicon CMOS detectors are available for imaging in the visible band, and uncooled silicon microbolometers are available for imaging in the LWIR band. Since neither of these detectors may require cryogenic refrigeration, and yet may be thermally stabilized, the detectors may be relatively small in size, low power and low disturbance.

Embodiments of a refractive optical system in accord with certain aspects of the present invention may use either of two design techniques. As discussed in more detail below, certain embodiments may include lenses formed of ionic (salt) compounds, which present fabrication challenges due to the solubility of the materials and are therefore not commonly used. Other embodiments may include lenses formed of a diamond material which is presently in early stages of development for the sizes and thicknesses needed for the lenses described herein. In both cases, crown-flint pairs of lenses or lens materials may be used to achieve wide spectral coverage, and optionally color correction (correction for chromatic aberration) over a portion of or the full spectral range of operation. In addition, certain embodiments use an inverse telephoto or "fisheye" configuration of the optics to achieve a wide field of view, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Referring to FIG. 1, there is illustrated a ray trace of an example of dual-band ("two-color") optical system having an inverse telephoto configuration and covering the visible and LWIR spectral bands. In one embodiment, the optical system 100 uses ionic salt crown materials, as discussed further below. In FIG. 1, the ray trace is illustrated "backwards" from the detector side (on the left) to object space on the right. In the illustrated example, incident electromagnetic radiation 105 enters the optical system 100 through a first lens pair 110, including a first lens 112 and a second lens 114, which directs the radiation to a first lens group 120 including lenses 122, 124 and 126. A second lens group includes lenses 130, 135, 140, and 145 which focus and direct the electromagnetic radiation via a window 150 and an aperture stop 160 to a beamsplitter 170. The beamsplitter 170 splits the electromagnetic radiation into the two spectral bands and directs the electromagnetic radiation to an image plane 180. One or more imaging detectors may be located at the image plane and configured to detect the electromagnetic radiation in at least the two spectral bands. In the illustrated example, the beamsplitter 170 is a cube beamsplitter; however, various other beamsplitter configurations may be used, as will be understood by those skilled in the art given the benefit of this disclosure.

According to one embodiment, the optical system 100 uses ionic (salt) crown materials for at least some of the lenses. As understood by those skilled in the art, crown materials, for a particular spectral band, are those having a high Abbe number (for example, approximately 60 or higher), and flint materials, for a particular spectral band, are those having a low Abbe number. Since the Abbe number of a given material is generally wavelength dependent, a given material may be a crown material in one spectral band and a flint material in another spectral band. Tables 1 and 2 below provide a listing of some materials, including various ionic salt compounds, including the Abbe number for each material in the visible spectral band (0.6-1.0 µm) and the LWIR spectral band (7.0-14.0 µm) and the refractive index. In Table 1, the materials are arranged from crown to flint for the visible spectral band, and in Table 2, the materials are arranged from crown to flint for the LWIR spectral band.

TABLE 1

| Material | Index | Abbe 0.6-1.0 um Vis | Abbe 7-14 um LW |
|---|---|---|---|
| KF* | 1.3 | 102 | 4 |
| NaF | 1.3 | 80 | 1.5 |
| Diamond | 2.4 | 61 | 7265 |
| KCl* | 1.5 | 58 | 17 |
| CsCl* | 1.6 | 49 | 30 |
| NaCl* | 1.5 | 47 | 10 |
| CsBr* | 1.67 | 38 | 71 |
| KBr* | 1.5 | 37 | 32 |
| NaBr* | 1.6 | 35 | 18 |
| NaI* | 1.7 | 30 | 28 |
| CsI* | 1.75 | 27 | 128 |
| KI* | 1.6 | 24 | 60 |

TABLE 1-continued

| Material | Index | Abbe 0.6-1.0 um Vis | Abbe 7-14 um LW |
|---|---|---|---|
| ZnSe | 2.4 | 12 | 32 |
| ZnTe | 2.7 | 7 | 65 |

*soluble in water.

TABLE 2

| Material | Index | Abbe 0.6-1.0 um Vis | Abbe 7-14 um LW |
|---|---|---|---|
| Diamond | 2.4 | 61 | 7265 |
| CsI* | 1.75 | 27 | 128 |
| CsBr* | 1.67 | 38 | 71 |
| ZnTe | 2.7 | 7 | 65 |
| KI* | 1.6 | 24 | 60 |
| KBr* | 1.5 | 37 | 32 |
| ZnSe | 2.4 | 12 | 32 |
| CsCl* | 1.6 | 49 | 30 |
| NaI* | 1.7 | 30 | 28 |
| NaBr* | 1.6 | 35 | 18 |
| KCl* | 1.5 | 58 | 17 |
| NaCl* | 1.5 | 47 | 10 |
| KF* | 1.3 | 102 | 4 |
| NaF | 1.3 | 80 | 1.5 |

*soluble in water.

As understood by those skilled in the art, a negative power lens of a flint material may be combined with a positive power lens of a crown material to produce an achromatic doublet. The dispersions of the crown and flint materials partially compensate for each other, producing reduced chromatic aberration compared to a singlet lens with the same focal length. Similarly, in the optical system 100 of FIG. 1, by selecting a crown material for certain lenses and a flint material for other lenses, chromatic aberration may be reduced, at least over a portion of the combine dual-band spectral coverage of the optical system.

According to one embodiment, to design the optical system 100 (or a variation thereof), in a first step, a crown material may be selected. As discussed above, the optical system 100 may be configured to cover the spectral bands from approximately 0.6-1.0 µm and approximately 7.0-14.0 µm by using one or more ionic salt compounds for the crown material(s). Accordingly, selection of the crown material may include evaluating ionic salt compounds, and optionally other crown materials to select a "best" crown material considering both spectral bands of interest. For example, referring to Tables 1 and 2, cesium bromide (CsBr) may be selected for the crown material due to having a relatively high Abbe number in both the visible and LWIR spectral bands (38 in the visible band and 71 in the LWIR band), and therefore relatively low dispersion in both bands. After the crown material has been selected, one may evaluate which flint material(s) are needed to achieve color correction over at least a portion of the spectral bands of interest. As discussed above, the Abbe number of most materials is wavelength dependent, and therefore there may not be one suitable material that is sufficiently flint in both spectral bands of interest. Accordingly, two or more flint materials may be selected to complement the chosen crown material. Furthermore, it will be appreciated that the "crown" or "flint" nature of various materials may be relative to other materials used in the optical system and may vary with spectral band. For example, CsBr is a crown material relative to NaCl in the LWIR spectral band, but not in the visible band.

In one example, for the optical system 100 configured for both the visible and LWIR bands as discussed above, and in which CsBr is used as the crown material, sodium chloride (NaCl) and zinc selenide (ZnSe) may be selected for the flint materials. ZnSe is a strong flint (Abbe number of 12) in the visible band, and NaCl is a strong flint (Abbe number of 10) in the LWIR band. Both materials are flints relative to CsBr. Referring to FIG. 1, at least one of the first and second lens groups may include a crown-flint pair to provide color correction in at least one of the spectral bands. In one example, the lenses 112, 114, 126, 130, and 135 are made of CsBr. In this example, lens 145 and window 150 may be made of ZnSe, and lenses 124 and 140 may be made of NaCl. In one example, the beamsplitter 170 includes CsBr. The combination of CsBr with ZnSe and NaCl may provide crown-flint pairings that provide color correction in the visible and LWIR spectral bands. It will be appreciated by those skilled in the art, given the benefit of this disclosure, that since ionic salt compounds, including CsBr and NaCl, have relatively low refractive indices, embodiments of optical system 100 using ionic salt compounds may include more lenses relative to systems designed using materials with higher refractive indices. In addition, since the ionic salt compounds are highly soluble, lenses manufactured from CsBr or NaCl may require special handling in all phases of fabrication and coating.

Table 3 below provides an optical prescription for an example of the optical system 100 using the above-mentioned materials. In this example, the optical system 100 has a nominal field of view of 114.2 degrees (approximately a 2 radian circular field of view), and an image (focal plane array) size of 5.0 centimeters (cm). The entrance pupil is 1.052 cm and the aperture stop 160 has a diameter of 2.094 cm. The nominal focal length is 2.662 cm, and the physical length of the system (from the front lens 112 to the image plane 180) is approximately 29 cm, resulting in a physical length to focal length ratio of approximately 11.6:1. The nominal speed of the system 100 is F/2.53. The front lens 112 has a diameter of 12.4 cm. In this example, the optical system 100 is configured to image over the 0.6-1.0 µm and 7.0-14.0 µm spectral bands.

TABLE 3

| Surface | Rd | CC | Ad | Ae | Af | Ag | Thk | Mat'l |
|---|---|---|---|---|---|---|---|---|
| 1 (image plane) | infin. | | | | | | 2.765 | Air |
| 2 (BS cube) | infin. | | | | | | 4.000 | CsBr |
| 3 | infin. | | | | | | 0.063 | Air |
| 4 (Stop) | infin. | | | | | | 0.0630 | Air |
| 5 (Window) | infin. | | | | | | 0.250 | ZnSe |
| 6 | infin. | | | | | | 0.143 | Air |

TABLE 3-continued

| Surface | Rd | CC | Ad | Ae | Af | Ag | Thk | Mat'l |
|---|---|---|---|---|---|---|---|---|
| 7 | −6.946 | 1.178 | −1.66E−03 | 9.71E−05 | 9.11E−05 | −6.61E−05 | 0.250 | ZnSe |
| 8 | −63.684 | | | | | | 0.048 | Air |
| 9 | −23.887 | | 1.90E−03 | −8.71E−04 | 2.56E−05 | 7.02E−05 | 0.250 | NaCl |
| 10 | 455.332 | | | | | | 0.034 | Air |
| 11 | −326.605 | | | | | | 0.501 | CsBr |
| 12 | −6.072 | −1.907 | −1.30E−04 | −1.53E−04 | −3.30E−05 | 8.11E−06 | 0.039 | Air |
| 13 | 15.250 | | | | | | 0.785 | CsBr |
| 14 | −8.117 | −1.848 | −2.25E−03 | 1.05E−04 | −2.41E−06 | 9.43E−09 | 2.683 | CsBr |
| 15 | 13.050 | | | | | | 1.207 | NaCl |
| 16 | −12.309 | | 5.97E−04 | −3.39E−09 | −2.18E−07 | −3.27E−08 | 0.372 | Air |
| 17 | −8.514 | | | | | | 0.563 | ZnSe |
| 18 | −8.023 | 0.0548 | 1.10E−04 | −1.34E−05 | 6.47E−07 | −1.30E−08 | 0.337 | Air |
| 19 | −6.222 | | | | | | 0.563 | CsBr |
| 20 | −6.338 | −0.4571 | −9.19E−05 | 2.95E−06 | −2.54E−07 | 1.68E−08 | 10.639 | Air |
| 21 | −6.061 | | 5.49E−04 | −4.33E−05 | 2.83E−06 | −1.45E−07 | 0.500 | CsBr |
| 22 | −70.895 | | | | | | 2.447 | Air |
| 23 | −5.604 | | −6.40E−04 | −5.52E−06 | −3.85E−07 | −3.29E08 | 0.500 | CsBr |
| 24 (object space) | −16.674 | | | | | | | Air |

In Table 3 and in Tables 4-6 below, the column designated Rd is the radius of the surfaces in units of linear dimension, e.g., centimeters. The minus sign indicates that the center of curvature is to the left of the surface. The column designated CC is the conic constant which is equal to the negative squared value of the eccentricity of a conic section (a planar cut through a double sheeted conic surface). The columns designated Ad, Ae, Af and Ag are the aspheric constants of the lens surfaces. The column designated "Thk" is the thickness of the surface.

Figure 2:
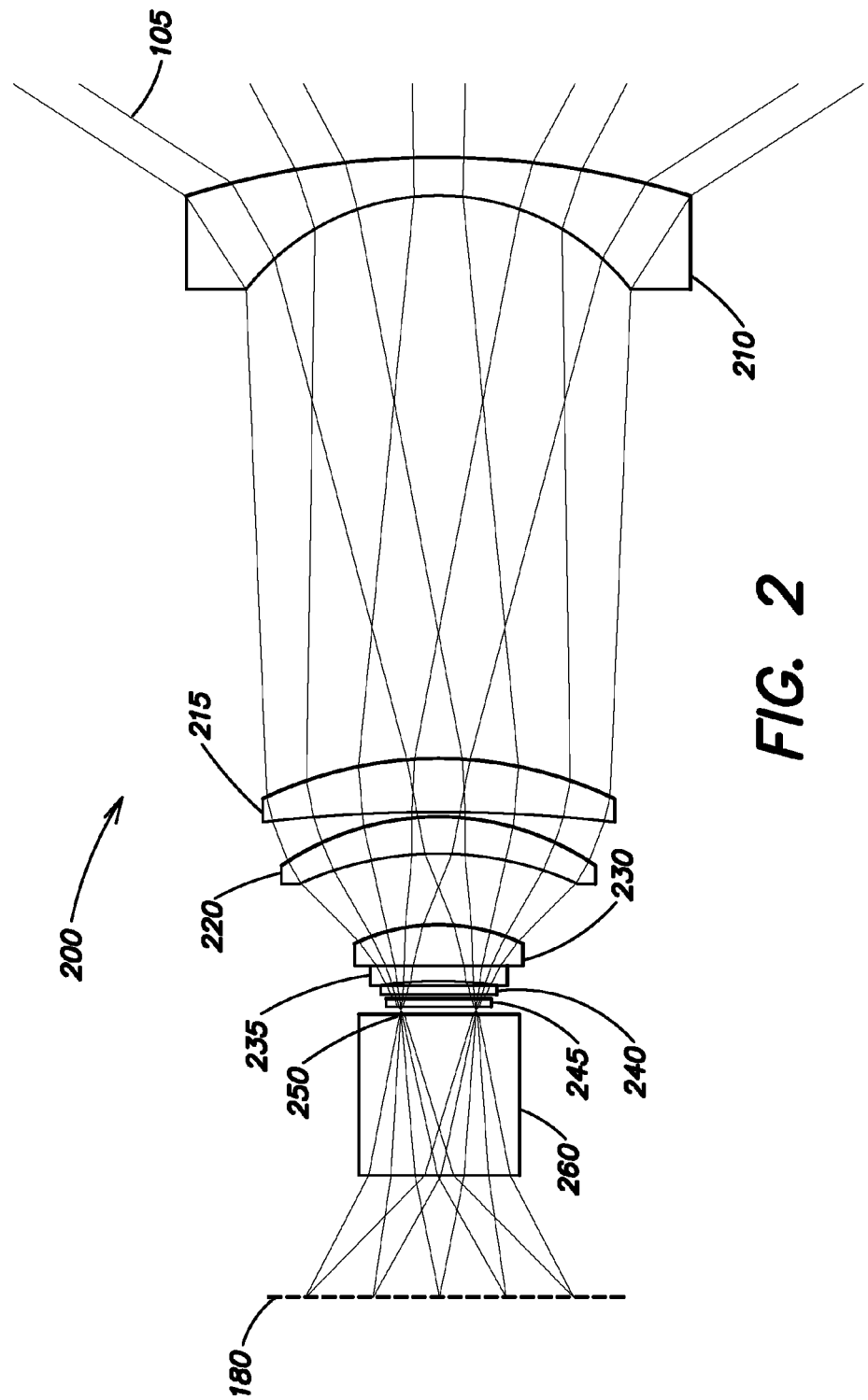
FIG. 2 is a ray trace of one example of a dual-band, visible-LWIR, inverse telephoto optical system using diamond according to aspects of the invention.

As discussed above, according to another embodiment, a two-band inverse telephoto optical system covering both the visible and LWIR spectral bands may be implemented using a diamond material rather than ionic salt compounds. Referring to FIG. 2, there is illustrated a ray trace of one example of a visible-LWIR optical system 200 that uses chemical vapor deposition (CVD) diamond for some of the lenses. In FIG. 2, similar to FIG. 1, the ray trace is illustrated "backwards" from the detector side (on the left) to object space on the right. In the illustrated example, incident electromagnetic radiation 105 enters the optical system 200 through a front lens 210 which directs the radiation to a second lens 215. The optical system 200 further includes additional lenses 220, 230, and 235, an aspheric corrector 240 and a window 245. The electromagnetic radiation passes via an aperture stop 250 to a beamsplitter 260 which splits the electromagnetic radiation into the two spectral bands and directs the electromagnetic radiation to the image plane 180. As discussed above, one or more imaging detectors may be located at the image plane and configured to detect the electromagnetic radiation in at least the two spectral bands. In the illustrated example, the beamsplitter 260 is a cube beamsplitter; however, various other beamsplitter configurations may be used, as will be understood by those skilled in the art given the benefit of this disclosure.

According to one embodiment, to design the optical system 200 (or a variation thereof), a crown material may be first selected, and based on the selected crown material, one or more flint materials may be selected. Similar to optical system 100, embodiments of the optical system 200 may be configured to cover the spectral bands from approximately 0.6-1.0 μm and approximately 7.0-14.0 μm. In one example, CVD diamond may be selected as the crown material. CVD diamond is a super-crown (having an Abbe number of 7265) in the LWIR spectral band. Accordingly, color correction may not be desired or needed for the LWIR band, and therefore, no flint material may be selected for this band. CVD diamond is a crown material in the visible spectral bands (having an Abbe number of 61). Accordingly, one or more flint materials may be selected to provide an achromatic doublet for the visible band to achieve color correction.

In one example, for the optical system 200 configured for both the visible and LWIR bands as discussed above, and in which CVD diamond is used as the crown material, cesium chloride (CsCl) and ZnSe may be selected for construction of an achromatic doublet in the visible band. CsCl (Abbe number of 49 in the visible) is a crown, and ZnSe (Abbe number of 12 in the visible) is a flint, and these may be used together in combination with CVD diamond to provide an effective color correcting achromat in the visible band. Referring to FIG. 2, in one example lenses 210, 215, and 220 are made of CVD diamond. In this example, lens 230 may be made of CsCl, and lens 235 may be made of ZnSe. The aspheric corrector 240, window 245 and beamsplitter 260 may each comprise CVD diamond. As mentioned above, since the Abbe numbers of CsCl and ZnSe are almost identical in the LWIR band (being 30 and 32, respectively), a CsCl and ZnSe lens pair ceases to be an achromat in this band, where color correction may not be necessary due to the super-crown nature of CVD diamond. Thus, embodiments of the optical system 200 using a combination of CVD diamond, ZnSe and CsCl may provide a dual-band system covering the LWIR and visible spectral bands, with effective color correction in the visible band using the flint materials, without disturbance in the LWIR band where color correction may not be needed. Furthermore, since CVD diamond has a relatively high index of refraction (n=2.4), the optical system may be very compact, having fewer lenses than optical system 100 since more "ray bending" may occur in a single CVD diamond lens of reasonable shape and with low aberrations.

Table 4 below provides an optical prescription for an example of the optical system 200 using CVD diamond, CsCl and ZnSe. In this example, the optical system 200 has a nominal field of view of 115 degrees (approximately a 2 radian circular field of view), and an image (focal plane array) size of 5.0 cm. The entrance pupil is 0.978 cm and the aperture stop 250 has a diameter of 1.41 cm. The nominal focal length is 2.486 cm, and the physical length of the system (from the front lens 210 to the image plane 180) is approximately 21 cm, resulting in a physical length to focal length ratio of approximately 8.4:1. The nominal speed of the system 200 is F/2.54. The diameter of the front lens 210 is 9.4 cm. In this example, the optical system 200 is configured to image over the 0.6-1.0 μm and 7.0-14.0 μm spectral bands.

TABLE 4

| Surface | Rd | CC | Ad | Ae | Af | Ag | Thk | Material |
|---|---|---|---|---|---|---|---|---|
| 1 (image plane) | infin. | | | | | | 2.242 | Air |
| 2 (BS Cube) | infin. | | | | | | 3.000 | Diamond |
| 3 | infin. | | | | | | 0.050 | Air |
| 4 (Stop) | infin. | | | | | | 0.066 | Air |
| 5 (Window) | infin. | | | | | | 0.132 | Diamond |
| 6 | infin. | | | | | | 0.053 | Air |
| 7 | infin. | | | | | | 0.050 | Air |
| 8 (Corrector) | infin. | | | | | | 0.133 | Diamond |
| 9 | infin. | | −5.18E−03 | −4.06E−03 | 1.39E−03 | −2.41E−04 | 0.100 | Air |
| 10 | −8.268 | | | | | | 0.297 | ZnSe |
| 11 | −51.154 | | 4.45E−03 | −2.35E−03 | 3.88-04 | 1.41E−04 | 0.026 | Air |
| 12 | −22.311 | | | | | | 0.700 | CsCl |
| 13 | −4.885 | 6.050 | −4.25E−05 | 1.48E−03 | 3.33E−05 | 4.72E−05 | 1.310 | Air |
| 14 | −6.855 | | | | | | 0.724 | Diamond |
| 15 | −6.425 | 1.504 | −5.61E−04 | −1.37E−04 | 3.17E−06 | −1.56E−07 | 0.053 | Air |
| 16 | −30.384 | | | | | | 1.000 | Diamond |
| 17 | −6.355 | −1.601 | 2.02E−04 | 7.85E−05 | −3.01E−06 | 3.11E−08 | 10.369 | Air |
| 18 | −4.736 | −0.1279 | −3.74E−04 | −2.36E−05 | 6.58E−07 | −6.06E−08 | 0.700 | Diamond |
| 19 (object space) | −15.902 | | | | | | | Air |

As may be appreciated with reference to FIGS. 1 and 2, in addition to providing broad spectral coverage, the optical systems 100 and 200 each have a rear external aperture stop position. Specifically, aperture stop 160 and aperture stop 250 are both located on the detector side (image plane side) of all lenses in the optical systems 100, 200 respectively. As a result, convenient use of 100% cold shielded infrared imaging detectors (positioned at the image plane 180) may be achieved because since no lenses are on the image plane side of the aperture stop, cold shielding need not be provided for the lenses. Therefore, a compact, less expensive cold shielding apparatus (such as a cryogenic Dewar, for example) may be used. In addition, the external rear aperture stop location may be beneficial in terms of reducing the effect of stray light or noise. In particular, imaging detectors located at the image plane 180 may directly see only optical surfaces and no structure of the optical systems 100, 200. Furthermore, although as discussed above, in certain embodiments, the optical systems 100 and 200 may be designed and configured for the 0.6-1.0 μm and 7.0-14.0 μm spectral bands, systems implemented according to the optical prescriptions given in Tables 3 and 4 additionally provide very good imagery in the spectral region from approximately 2.5-5.0 μm. Thus, embodiments of the optical systems 100, 200 may provide essentially continuous spectral coverage over a broad spectral range.

The embodiments discussed above with respect to FIGS. 1 and 2 provide inverse telephoto optics with broad spectral coverage using combinations or ionic salt compounds and/or CVD diamond for the lens materials. According to other embodiments provide dual-band or multi-band optics with a small, real entrance pupil, using the same or similar combinations of materials. Having a small entrance pupil or aperture, for example, approximately 1 cm, allows for a more covert system, yet embodiments may still achieve a very wide field of view, for example, approximately 120 degrees, similar to the inverse telephoto examples discussed above. In some examples such optical systems are configured to cover at least the visible and LWIR spectral bands.

Figure 3:
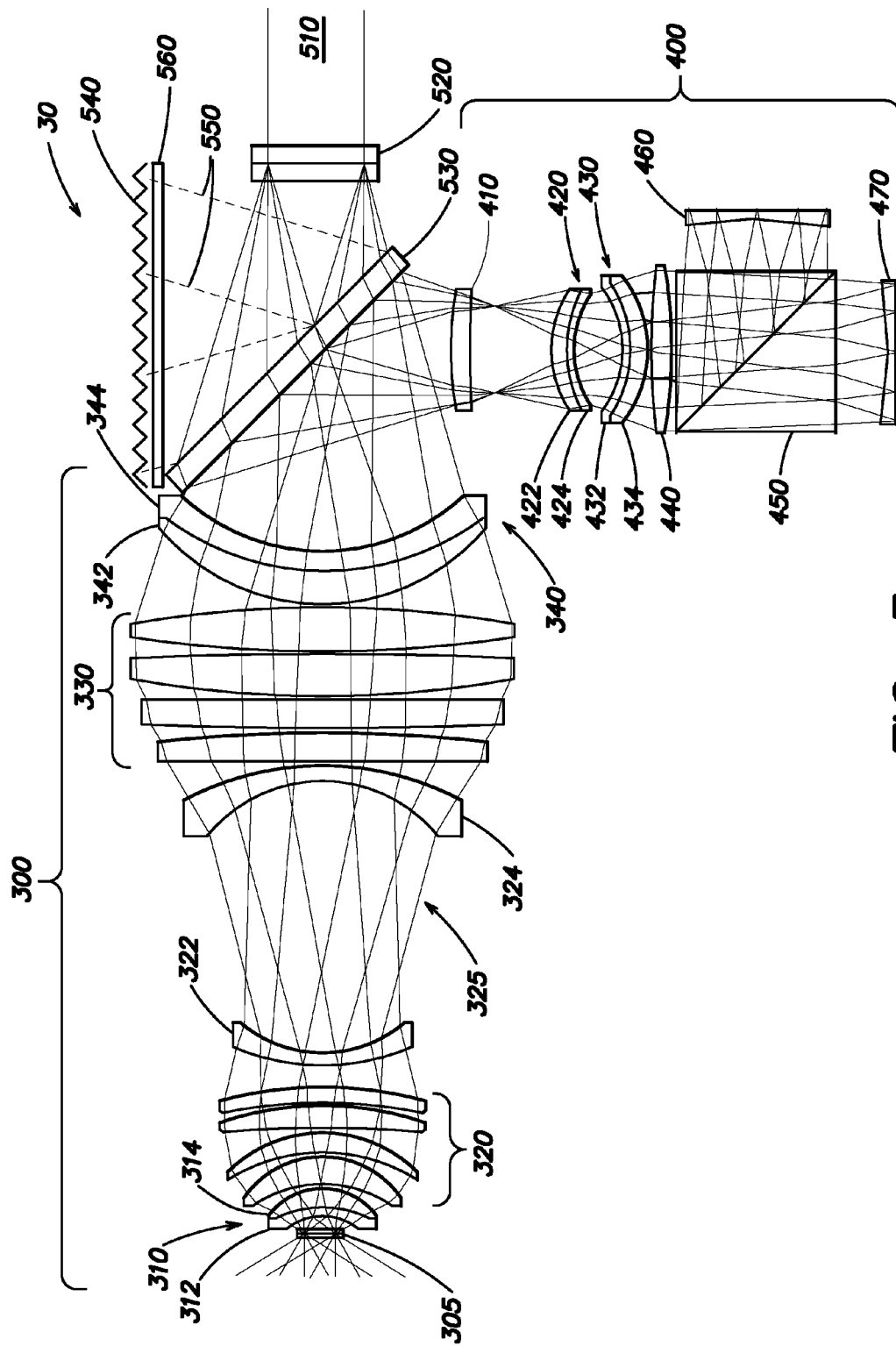
FIG. 3 is a ray trace of one example of a multi-function optical system according to aspects of the invention.

Referring to FIG. 3 there is illustrated a ray trace of one example of a dual-band optical system 30 including a steerable laser channel and having a real entrance pupil. In one example, the optical system 30 comprises a re-imaged afocal optical system 300 and an imaging optical system 400. Such an optical system may be used for search and acquisition applications, for example. In the embodiment illustrated in FIG. 3, CVD diamond is used for several of the lenses to achieve a compact design with broad spectral coverage and excellent image formation.

In the illustrated example, the optical system 30 includes a dual-band imaging system configured to image objects using electromagnetic radiation in the visible and LWIR spectral bands, as discussed above. In one example, the optical system 30 has a 1 cm entrance aperture 305 and is configured to provide a 120 degree diameter field of view. The optical system 30 includes afocal foreoptics 300 and an imaging optical subsystem 400. The optical system 30 further includes a laser input 510 and is configured to direct the laser beam via the foreoptics 300 through the entrance aperture 305 to object space. In one example, the laser input has a 3 cm diameter. Thus, the foreoptics 300 may be considered a 3:1 pupil relay since the 3 cm diameter laser input is relayed to a 1 cm entrance aperture of the system 30. According to one embodiment, a steering element 520 is configured to steer the laser input beam inside the field of view of the optical system 30 at the entrance pupil 305. In one example, the steering element 520 includes a Risley grating steering pair which may have a steering angle capability of approximately ±20 degrees. An example of a Risley grating steering pair which may be used for the steering element 520 is described in U.S. Pat. No. 6,792,028, which is herein incorporated by reference in its entirety. It is also to be appreciated that other beam steering devices may be employed in such systems with satisfactory results. A Risley prism pair and a conventional beamsteering minor are two examples of such. A beamsplitter 530 may be used to separate the laser channel form the imaging channel, directing the laser input 510 through to the foreoptics 300 and directing electromagnetic radiation in at least the two imaging spectral bands (e.g., the visible and LWIR spectral bands, as discussed above) to the imaging optical subsystem 400, as shown in FIG. 3. The laser input may have a wavelength of approximately 1.06 μm or 0.53 μm for example.

foreoptics 300 has a nominal magnification of 2.97×. In this example, the optical system 200 is configured to image over the 0.6-1.0 μm and 7.0-14.0 μm spectral bands.

TABLE 5

| Surface | Rd | CC | Ad | Ae | Af | Ag | Thk | Material |
|---|---|---|---|---|---|---|---|---|
| 1 | infin. | | | | | | 0.050 | Diamond |
| 2 (stop) | infin. | | 0.386 | 0.449 | 9.955 | | 0.204 | Air |
| 3 | −0.74 | −5.932 | −2.155 | 3.236 | −2.151 | −20.919 | 0.100 | ZnSe |
| 4 | −1.191 | | | | | | 0.245 | CsCl |
| 5 | −0.776 | | | | | | 0.050 | Air |
| 6 | −1.556 | −0.790 | −0.215 | 0.458 | −0.691 | 0.451 | 0.348 | Diamond |
| 7 | −1.147 | | | | | | 0.050 | Air |
| 8 | −1.593 | 0.600 | 0.239 | −0.272 | 0.200 | −4.14E−02 | 0.250 | Diamond |
| 9 | −1.596 | | | | | | 0.050 | Air |
| 10 | 10.967 | | −9.72E−02 | 5.15E−02 | −1.17E−02 | | 0.250 | Diamond |
| 11 | −4.354 | | | | | | 0.049 | Air |
| 12 | −4.468 | | 7.33E−02 | 6.42E−02 | −4.63E−02 | 9.12E−03 | 0.210 | Diamond |
| 13 | −4.918 | | | | | | 0.295 | Air |
| 14 | 3.296 | | 2.83E−02 | 1.31E−02 | −6.89E−02 | 3.94E−02 | 0.150 | CsI |
| 15 | 1.669 | | | | | | 3.339 | Air |
| 16 | −1.886 | | −1.59E−03 | −1.43E−03 | 4.84E−04 | | 0.200 | CsI |
| 17 | −3.638 | | | | | | 0.061 | Air |
| 18 | −87.441 | | | | | | 0.350 | Diamond |
| 19 | −13.997 | | −3.44E−03 | 1.42E−03 | −6.17E−05 | | 0.050 | Air |
| 20 | 62.548 | | | | | | 0.350 | Diamond |
| 21 | 88.692 | | −2.23E−04 | −2.93E−04 | 1.46E−06 | 2.55E−06 | 0.050 | Air |
| 22 | 13.915 | | | | | | 0.500 | Diamond |
| 23 | −193.686 | | −3.62E−04 | −1.95E−04 | 1.49E−05 | −3.96E−07 | 0.050 | Air |
| 24 | 11.292 | | −3.45E−03 | −2.05E−05 | 1.94E−05 | −3.86E−07 | 0.550 | Diamond |
| 25 | −14.339 | | | | | | 0.050 | Air |
| 26 | 2.758 | | | | | | 0.399 | CsCl |
| 27 | 3.393 | | | | | | 0.250 | ZnSe |
| 28 | 2.957 | −0.0271 | 5.33E−03 | −8.83E−04 | 1.75E−04 | −4.55E−06 | 4.517 | Air |
| 29 (exit pupil) | | | | | | | | |

According to one embodiment, the foreoptics 300 is configured as a pupil relay, and includes a first lens pair 310 positioned near the entrance aperture 305, and includes a first lens 312 of ZnSe and a second lens 314 of CsCl. The lens pair 310 is followed by a first lens group 320 including a plurality of lenses, each made of CVD diamond. Adjacent the first lens group 320 is a third lens 332, followed by a fourth lens 324. In one example, each of the lenses 322, 324 is made of cesium iodide (CsI). An intermediate image 325 is formed between the third and fourth lenses 322, 324, as discussed further below. A second lens group 330 is positioned adjacent the fourth lens 324. The second lens group 330 includes a plurality of lenses, each made of CVD diamond. A second lens pair 340 is positioned adjacent the second lens group 330 and directs electromagnetic radiation from the second lens group 330 to the beamsplitter 530, and vice versa. In one example the second lens pair 340 includes a first lens 342 of CsCl and a second lens 344 of ZnSe. In one example, the first and second lens pairs 310 and 340 are achromatic doublets configured to provide color correction in the visible spectral band using CsCl as a crown material and ZnSe as a flint material, as discussed above with reference to FIG. 2. As also discussed above, since the optical system 300 uses CVD diamond lenses, color correction may be unnecessary in the LWIR spectral band.

Table 5 below provides an optical prescription for an example of the foreoptics 300 of the optical system 30 using CVD diamond, CsCl and ZnSe lenses. In this example, the optical system 30 has a nominal field of view of 120 degrees. The entrance pupil of the foreoptics 300 is 0.4 inches in diameter, and the exit pupil is 1.187 inches in diameter. The Still referring to FIG. 3, the imaging optical subsystem 400 receives the electromagnetic radiation in at least the two spectral bands (for a dual-band system), for example, the visible and LWIR spectral bands as discussed above. In the illustrated example the imaging optical subsystem 400 includes a first lens 410 made of CVD diamond, followed by two lens pairs, or doublets, 420, 430, followed by a second lens 440 of CVD diamond. In one example, each lens pair 420, 430 includes one lens of ZnSe and another of CsCl to provide achromatic doublets for further color correction in the visible band, as discussed above. For example, the first lens pair 420 may include a first lens 422 of CsCl and a second lens 424 of ZnSe, and the second lens pair 430 may include a first lens 432 of ZnSe and a second lens 434 of CsCl. In other examples, the arrangement may be reversed, such that the first lens pair 420 includes a first lens 422 of ZnSe and a second lens 424 of CsCl, and the second lens pair 430 includes a first lens 432 of CsCl and a second lens 434 of ZnSe.

The arrangement of lenses 410, 420, 430, and 440 direct the electromagnetic radiation to a beamsplitter 450 which separates the radiation into the two spectral bands, and directs the visible band to a first imaging detector 460 and directs the LWIR band to a second imaging detector 470. It is to be appreciated that the positioning of the first and second imaging detectors 460 and 470 may be reversed, but in terms of dichroic beamsplitter coating design, the first orientation is often preferred. In the illustrated example, the beamsplitter 450 is a cube beamsplitter. The imaging detectors 460 and 470 may be focal plane array image sensors, for example.

Embodiments of the optical system 30 may provide a system having the positive benefits of the inverse telephoto optics discussed above, namely a wide field of view, dual-band or multi-band operation, and a compact size, in addition to the added benefit of a small entrance aperture to allow for covert imaging. In addition, the foreoptics 300 may provide a well-corrected afocal interface for steerable laser functions, as discussed above.

In one embodiment, the optical system may be further configured to allow the imaging channel to provide feedback regarding the pointing direction of the laser input 510. As discussed above, the beamsplitter 350 directs the laser input 510 to the foreoptics 300. However a portion of laser beam may reflect off the beamsplitter 350 and be directed to a corner cube array 540 that returns at least some laser radiation as an auto-alignment beam 550. This auto-alignment beam may be directed through the beamsplitter 530 to the imaging optical subsystem 400 which directs the beam to one of the imaging sensors 460 or 470. In certain examples, wavelength of the laser input 510 may fall within the visible spectral band, and the auto-alignment beam may therefore be directed by the cube beamsplitter 450 to the visible imaging detector 460. The auto-alignment beam may appear as a "dot" in the visible image produced by the visible imaging detector 460, thereby providing pointing or steering information regarding the laser beam. This information may be used to control the steering device 520 to steer the laser beam to point at a selected target within the field of view of the optical system 30. A neutral density (ND) filter 560, or other attenuation device, may be positioned between the corner cube array 540 and the beamsplitter 530, for example, adjacent the corner cube array as illustrated in FIG. 3, to attenuate the auto-alignment beam so as to avoid saturation or damage to the visible imaging detector 460.

Thus, embodiments of the optical system 30 may allow for imaging in both the visible and LWIR spectral bands, in combination with laser range-finding or other laser-based functions.

As discussed above, embodiments of the optical system 30 use CVD diamond lenses to achieve a compact system with excellent image formation and no need for color correction in the LWIR spectral band. Embodiments of a pupil relay may be alternatively implemented using other lens materials, for example, ionic salt compounds.

Figure 4:
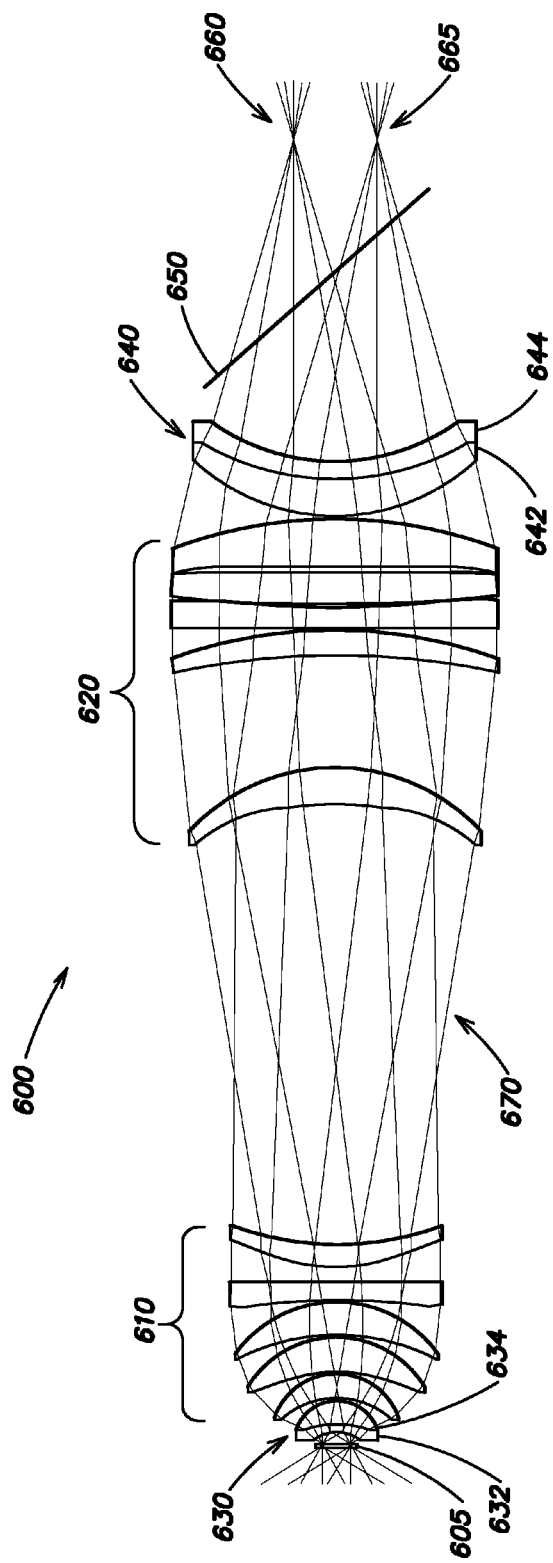
FIG. 4 is a ray trace of one example of a pupil relay according to aspects of the invention.

Referring to FIG. 4 there is illustrated a ray trace of one example of a refractive pupil relay 600 implemented using ionic salt compounds for at least some of the lenses. In one example, the optical system 600 has 1 cm entrance aperture 605 and is configured to provide a 120 degree diameter field of view, similar to the optical system 30 discussed above. The system 600 includes a first group of lenses 610 and a second group of lenses 620, each group including a plurality of lenses made of an ionic salt compound. In one example, for a system configured for the visible and LWIR spectral bands, as discussed above, the ionic salt compound used for the lenses of the groups 610 and 620 is CsBr. The system 600 may include a first lens pair 630 positioned between the first lens group 610 and the aperture 605, and a second lens pair 640 positioned on the detector side of the second lens group 620, as shown in FIG. 4. The lens pairs may be configured as achromatic doublets, each including a crown-flint pair of materials configured to provide color correction over at least a portion of the spectral bands of operation of the system 600. In one example the first lens pair 630 includes a first lens 632 of ZnSe and a second lens 634 of CsI. In one example the second lens pair 640 includes a first lens 642 of CsI and a second lens 644 of ZnSe. A beamsplitter 650 may be used to split the incident electromagnetic radiation into the two spectral bands, for example, the visible and LWIR bands, and direct each band to a corresponding imaging detector located at respective images planes 660, 665. Similar to the optical system 30, in the optical system 600 an intermediate image 670 is formed between the two groups of lenses 610, 620.

Table 6 below provides an optical prescription for an example of the pupil relay 600 using ionic salt compounds for at least some of the lenses. In this example, the optical system 600 has a nominal field of view of 120 degrees. The entrance pupil is 0.4 inches in diameter, and the exit pupil is 1.187 inches in diameter. The optical system 600 has a nominal magnification of 2.97×. In this example, the optical system 600 is configured to image over the 0.6-1.0 μm and 7.0-14.0 μm spectral bands.

TABLE 6

| Surf. | Rd | CC | Ad | Ae | Af | Ag | Thk | Material |
|---|---|---|---|---|---|---|---|---|
| 1 | infin. | | | | | | 0.050 | CsBr |
| 2 (stop) | infin. | | 0.0434 | −1.271 | −0.2021 | | 0.168 | Air |
| 3 | −0.628 | −4.038 | −2.652 | −6.714 | 91.856 | −713.94 | 0.100 | ZnSe |
| 4 | −1.748 | | | | | | 0.325 | CsI |
| 5 | −0.647 | | | | | | 0.030 | Air |
| 6 | −1.277 | 0.809 | −0.263 | 0.616 | −0.458 | 0.453 | 0.330 | CsBr |
| 7 | −0.973 | | | | | | 0.030 | Air |
| 8 | −1.711 | −0.775 | 0.230 | −0.233 | 0.129 | −2.82E−02 | 0.470 | CsBr |
| 9 | −1.529 | | | | | | 0.030 | Air |
| 10 | −3.461 | | 7.54E−04 | 1.05E−02 | −6.92E−03 | | 0.450 | CsBr |
| 11 | −1.859 | | | | | | 0.030 | Air |
| 12 | −7.975 | | −2.24E−02 | 1.73E−02 | −2.32E−04 | −3.03E−04 | 0.250 | CsBr |
| 13 | −304.910 | | | | | | 0.200 | Air |
| 14 | 2.757 | | −5.45E−03 | −3.51E−03 | −5.75E−04 | 7.56E−05 | 0.300 | CsBr |
| 15 | 4.485 | | | | | | 5.988 | Air |
| 16 | −7.130 | | −1.25E−02 | −4.39E−04 | −3.80E−05 | −6.85E−06 | 0.500 | CsBr |
| 17 | −2.955 | | | | | | 1.519 | Air |
| 18 | −12.237 | | | | | | 0.350 | CsBr |
| 19 | −11.994 | | −9.50E−03 | 8.29E−04 | 1.39E−06 | −1.17E−07 | 0.050 | Air |
| 20 | −227.619 | | | | | | 0.250 | CsBr |
| 21 | 11.053 | | −1.85E−03 | −6.46E−04 | −3.77E−06 | 4.00E−06 | 0.050 | Air |
| 22 | 24.841 | | | | | | 0.450 | CsBr |
| 23 | −82.736 | | 7.46E−04 | −1.61E−04 | 9.80E−06 | −1.89E−06 | 0.050 | Air |
| 24 | 23.480 | | −6.48E−03 | −8.89E−05 | 1.41E−05 | 1.25E07 | 0.650 | CsBr |
| 25 | −7.178 | | | | | | 0.050 | Air |

TABLE 6-continued

| Surf. | Rd | CC | Ad | Ae | Af | Ag | Thk | Material |
|---|---|---|---|---|---|---|---|---|
| 26 | 3.130 | | | | | | 0.500 | CsI |
| 27 | 3.990 | | | | | | 0.250 | ZnSe |
| 28 | 3.035 | −2.296 | 7.39E−03 | −4.87E−04 | 1.15E−04 | −2.56E−06 | 4.484 | Air |
| 29 (exit pupil) | | | | | | | | |

As discussed above, both the optical system 30 and the pupil relay 600 include an intermediate image. According to certain embodiments, this intermediate image provides a convenient location at which to place a protection device, such as an attenuator, limiter or filter, for example, to protect the downstream imaging detectors from damage. For example, if the system is pointed at or near a bright object, such as the sun, for example, an attenuator or other protection device may be conveniently placed at the intermediate image position to protect the imaging detectors without requiring modifications to the configuration and/or positioning of the lenses in the optical systems.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A multi-band refractive optical imaging system comprising:
a plurality of lenses configured to receive and propagate electromagnetic radiation in at least the visible spectral band and the longwave infrared (LWIR) spectral band, the plurality of lenses including a first group of lenses of a first crown material, at least one lens of a first flint material, and at least one lens of a second material, different than the first crown material and the first flint material, the plurality of lenses including at least one crown-flint pair configured as an achromat to provide color correction in at least one of the visible spectral band and the LWIR spectral band;
a first beamsplitter configured to receive the electromagnetic radiation from the plurality of lenses, to separate the electromagnetic radiation into the visible spectral band and the LWIR spectral band; and
a rear external aperture stop positioned between the plurality of lenses and the first beamsplitter.

2. The multi-band refractive optical imaging system of claim 1, wherein the optical imaging system has an inverse telephoto configuration.

3. The multi-band refractive optical imaging system of claim 2, wherein the first crown material is an ionic salt compound and the first flint material is an ionic salt compound.

4. The multi-band refractive optical imaging system of claim 3, wherein the first crown material is cesium bromide, the first flint material is sodium chloride, and the second material is zinc selenide.

5. The multi-band refractive optical imaging system of claim 2, wherein the first beamsplitter is a cube beamsplitter.

6. The multi-band refractive optical imaging system of claim 5, wherein the first beamsplitter comprises cesium bromide.

7. The multi-band refractive optical imaging system of claim 2, wherein the first crown material is CVD diamond, and the achromat is a visible achromat that provides color correction in the visible spectral band.

8. The multi-band refractive optical imaging system of claim 7, wherein at least one crown-flint pair of the visible achromat comprises the second material, selected to be cesium chloride, and the first flint material, selected to be zinc selenide.

9. The multi-band refractive optical imaging system of claim 7, wherein the plurality of lenses further comprises an aspheric corrector.

10. The multi-band refractive optical imaging system of claim 1, wherein the plurality of lenses is configured as a pupil relay, the system further comprising:
an imaging optical sub-system including a second plurality of lenses, the first beamsplitter, and the rear external aperture stop; and
a second beamsplitter positioned between the pupil relay and the imaging optical sub-system, the second beamsplitter configured to direct the electromagnetic radiation from the pupil relay to the imaging optical sub-system.

11. The multi-band refractive optical imaging system of claim 1, wherein the first group of lenses includes a first sub-group including at least two lenses and a second sub-group including at least two lenses, and wherein the pupil relay is configured to produce an intermediate image between the first and second sub-groups.

12. The multi-band refractive optical imaging system of claim 11, wherein the first crown material is cesium bromide.

13. The multi-band refractive optical imaging system of claim 12, wherein the first flint material is cesium iodide, and the second material is zinc selenide.

14. The multi-band refractive optical imaging system of claim 11, wherein the first crown material is CVD diamond.

15. The multi-band refractive optical imaging system of claim 14, wherein the at least one lens of the first flint material includes two lenses of the first flint material, the two lenses positioned between the first sub-group and the second sub-group, and wherein the intermediate image is produced between the two lenses.

16. The multi-band refractive optical imaging system of claim 15, wherein the first flint material is cesium iodide.

17. The multi-band refractive optical imaging system of claim 11, further comprising a laser input configured to provide a laser beam to the pupil relay via the second beamsplitter, the pupil relay being further configured propagate the laser beam to an entrance aperture of the optical imaging system.

18. The multi-band refractive optical imaging system of claim 17, further comprising a corner cube array, wherein the second beamsplitter is configured to reflect a portion of the laser beam onto the corner cube array, the corner cube array being configured to return the portion of the laser beam, through the second beamsplitter to the imaging optical subsystem as an auto-alignment beam.

19. The multi-band refractive optical imaging system of claim 18, wherein the auto-alignment beam is in the visible spectral band, and wherein the first beamsplitter is configured to direct the auto-alignment beam to a visible-band detector.

20. The multi-band refractive optical imaging system of claim 19, wherein the first beamsplitter is further configured to direct the LWIR spectral band onto a thermal imaging detector.

* * * * *